US008738852B2

(12) United States Patent
Gupta et al.

(10) Patent No.: US 8,738,852 B2
(45) Date of Patent: May 27, 2014

(54) MEMORY CONTROLLER AND A DYNAMIC RANDOM ACCESS MEMORY INTERFACE

(75) Inventors: Alok Gupta, Fremont, CA (US); Barry A. Wagner, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 32 days.

(21) Appl. No.: 13/223,004

(22) Filed: Aug. 31, 2011

(65) Prior Publication Data

US 2013/0054884 A1 Feb. 28, 2013

(51) Int. Cl.
*G06F 12/00* (2006.01)

(52) U.S. Cl.
USPC .......................................... 711/105; 714/758

(58) Field of Classification Search
CPC ....... G06F 9/3897; G06F 13/20; G06F 13/38; G06F 9/44521
USPC .......................................... 711/105; 714/758
See application file for complete search history.

(56) References Cited

U.S. PATENT DOCUMENTS

| 8,194,087 | B2 * | 6/2012 | Perego | 345/542 |
|---|---|---|---|---|
| 2002/0196681 | A1 * | 12/2002 | Tanizaki | 365/200 |
| 2002/0196688 | A1 * | 12/2002 | Ernst et al. | 365/201 |
| 2005/0080987 | A1 | 4/2005 | Zitlaw | |
| 2005/0154946 | A1 | 7/2005 | Mitbander et al. | |
| 2006/0230250 | A1 | 10/2006 | Klint et al. | |
| 2007/0211554 | A1 * | 9/2007 | Pelly et al. | 365/230.02 |
| 2007/0294466 | A1 | 12/2007 | Gower et al. | |
| 2008/0028127 | A1 * | 1/2008 | Ware et al. | 711/100 |
| 2008/0106967 | A1 | 5/2008 | Oh | |
| 2008/0140899 | A1 * | 6/2008 | Oh et al. | 710/300 |
| 2011/0072200 | A1 * | 3/2011 | Lee et al. | 711/103 |
| 2011/0202803 | A1 | 8/2011 | Schneider et al. | |

FOREIGN PATENT DOCUMENTS

| WO | 2009049970 A1 | 4/2009 |
|---|---|---|
| WO | 2010057312 A1 | 5/2010 |

OTHER PUBLICATIONS

GB Search and Examination Report dated Dec. 13, 2012, Application No. GB1214735.1.

* cited by examiner

*Primary Examiner* — Hashem Farrokh
(74) *Attorney, Agent, or Firm* — Patterson & Sheridan, LLP (57) ABSTRACT

A memory controller and a dynamic random access memory (DRAM) interface are disclosed. The memory controller implements signals for the DRAM interface. The DRAM interface includes a differential clock signal, an uncalibrated parallel command bus, and a high-speed, serial address bus. The command bus may be used to initiate communication with the memory device upon power-up and to initiate calibration of the address bus.

17 Claims, 5 Drawing Sheets

Figure 6

MEMORY CONTROLLER AND A DYNAMIC RANDOM ACCESS MEMORY INTERFACE

BACKGROUND OF THE INVENTION

1. Field of the Invention

The invention relates generally to a memory interface and, more specifically, to a memory controller and a dynamic random access memory (DRAM) interface.

2. Description of the Related Art

Current standard memory interfaces typically implement a parallel command and address bus. For example, the JEDEC specification for DDR3 SDRAM defines sixteen address pins (A0-A15), three bank address pins (BA0-BA2), and five command pins (CS#, CKE#, RAS#, CAS#, WE#), for a total of twenty-four pins. The JEDEC specification for GDDR5 SGRAM defines fourteen address pins (A0-A12, plus RFU (Reserved)) and four bank address pins (BA0-BA3) (sharing nine physical pins via double data rate addressing), an address bus inversion pin (ABI#), and five command pins (CS#, CKE#, RAS#, CAS#, WE#), for a total of fifteen pins.

Other types of interfaces implement a high-speed serial interface. For example, DisplayPort® and Peripheral Component Interconnect Express® (PCIe) have one or more lanes (differential signals for communication) for command and data transfer. However, the serial interfaces typically require extensive calibration in order to provide the necessary bandwidth of data transmission. For example, the PCIe standard defines a link training sequence that must be performed before data may be transmitted over the serial link. The link training sequence discovers the number of lanes in the link, the maximum speed of the link, and the physical properties of the link such as timing skew for each lane. The serial link needs to determine these parameters before the link can be operated at high speeds while maintaining the accuracy of the data transmission. These interfaces may also require a low-speed sideband communication channel to initiate calibration, such as the auxiliary channel in DisplayPort®.

One drawback to conventional memory interfaces is that the parallel command and address bus requires a large number of interconnects. Routing between the memory controller and the memory device may become complex and requires a lot of physical space in the layout of the printed circuit board. Although switching to a purely serial command and address bus may reduce the number of interconnects required, the requirements of extensive calibration causes a latency at power-up before any data may be transmitted over the link. Furthermore, a sideband communication channel may be required in order to calibrate the serial link, which adds extra interconnects that are not used during normal operation.

As the foregoing illustrates, what is needed in the art is an improved technique for sending commands and addresses to a memory device.

SUMMARY OF THE INVENTION

One embodiment of the present invention sets forth a memory interface configured to communicate with a memory device. The memory interface includes a differential clock channel for transmitting a reference clock signal to the memory device, an uncalibrated parallel command bus for transmitting one or more commands to the memory device, and a serial address bus for transmitting one or more addresses to the memory device, where each address identifies a location within the memory device.

Another embodiment of the present invention sets forth a system that includes a memory device and a memory interface configured to communication with the memory device. The memory interface includes a differential clock channel for transmitting a reference clock signal to the memory device, an uncalibrated parallel command bus for transmitting one or more commands to the memory device, and a serial address bus for transmitting one or more addresses to the memory device, where each address identifies a location within the memory device Yet another embodiment of the present invention sets forth a method for communicating with a memory device. The method includes the steps of transmitting a reference clock signal to the memory device via a differential clock channel, transmitting one or more commands to the memory device via an uncalibrated parallel command bus, and transmitting one or more addresses to the memory device via a serial address bus, where each address identifies a location within the memory device.

One advantage of the disclosed technique is that the number of interconnects required to transmit commands and addresses to the memory device is reduced relative to industry standard parallel interfaces. In addition, by separating the command bus from the address bus, the small uncalibrated parallel command bus may be used to initiate calibration of the serial address bus, thereby obviating the need for a separate, low-speed sideband communications channel that is not used during normal operation.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
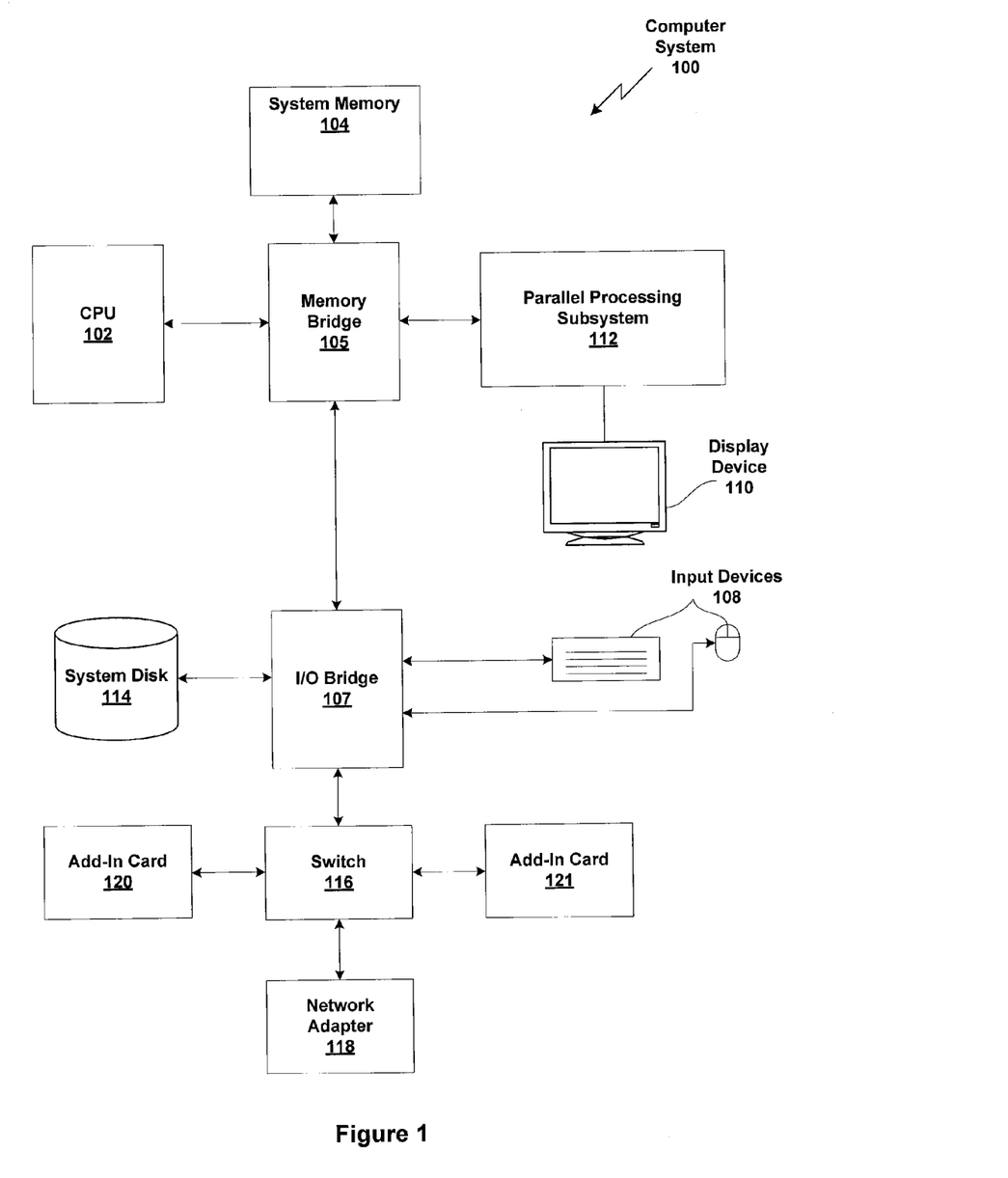
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a memory bridge 105. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via memory bridge 105. A parallel processing subsystem 112 is coupled to memory bridge 105 via a bus or other communication path (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
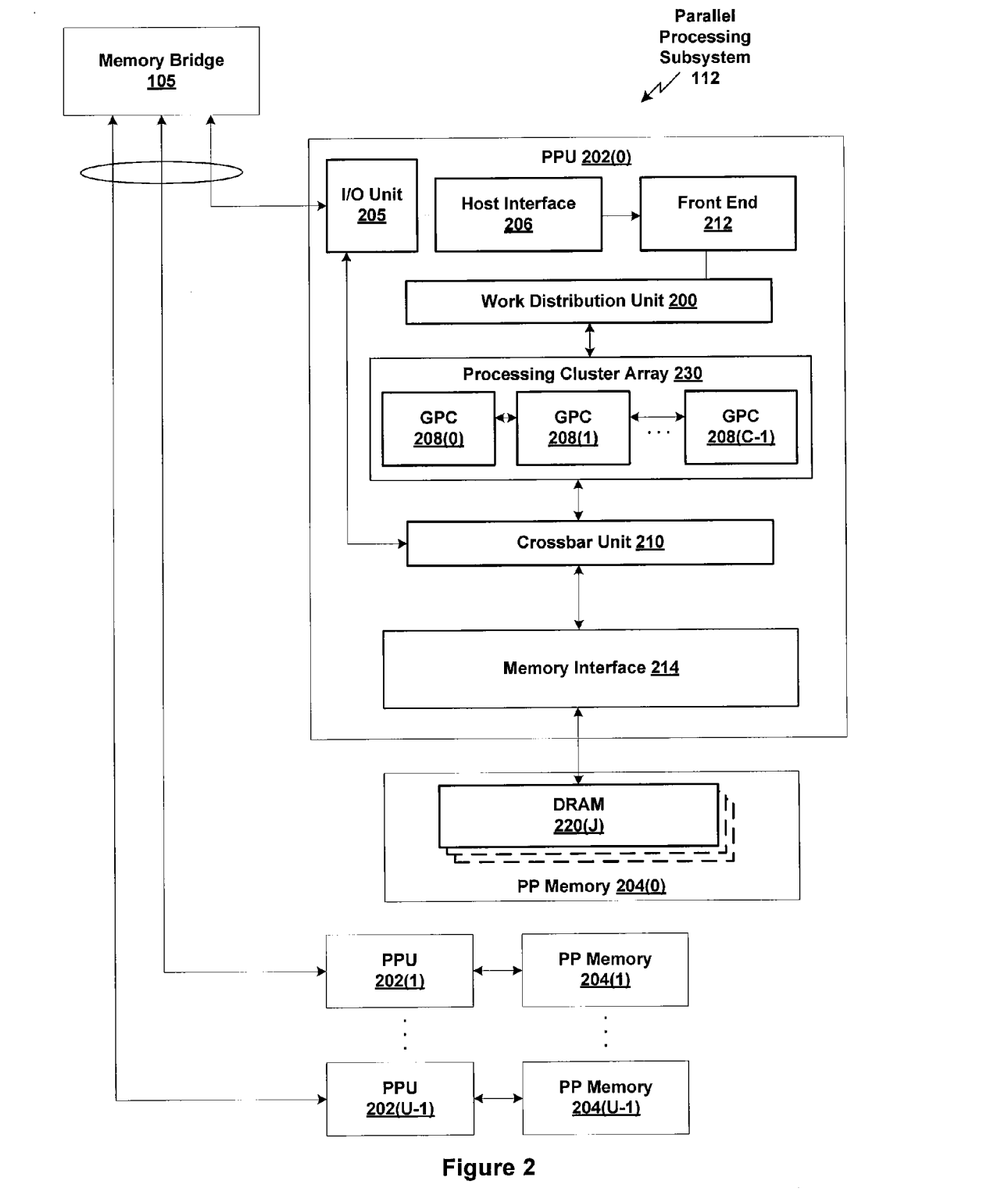
FIG. 2 illustrates a parallel processing subsystem, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where 1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105. PPU 202 is configured to interact with local parallel processing memory 204 (which can be used as graphics memory including, e.g., a conventional frame buffer) to store and update pixel data, deliver pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. A pushbuffer is a memory buffer that is accessible by both CPU 102 and PPU 202. CPU 102 writes a command stream and graphics data to the pushbuffer. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

I/O unit 205 generates packets (or other signals) for transmission to CPU 102 and also receives all incoming packets (or other signals) from CPU 102, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the push buffer is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Any one of GPCs 208 may process data to be written to any of the DRAM modules 220 within parallel processing memory 204. Crossbar unit 210 is configured to route the output of each GPC 208 to the input of the memory interface 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and memory interface 214.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204 and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to memory bridge 105, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Memory Interface

Figure 3:
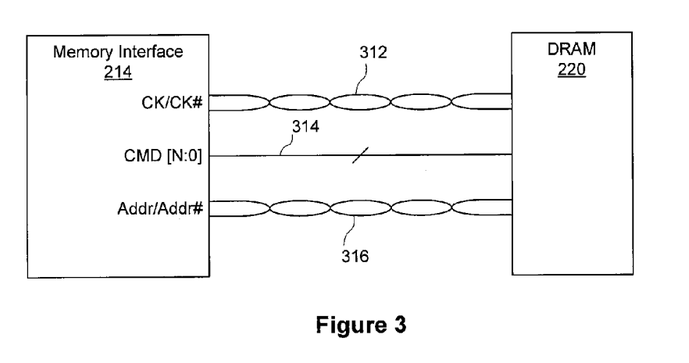
FIG. 3 illustrates a portion of a memory interface, according to one embodiment of the present invention.

FIG. 3 illustrates a portion of a memory interface, according to one embodiment of the present invention. In conventional memory interfaces such as the JEDEC DDR3 SDRAM interface, the command bus and the address bus are a single-ended parallel interface. For example, DDR3 SDRAM includes five command pins and nineteen address pins (sixteen address pins and three bank address pins). Each interconnect is unidirectional from the memory interface to the DRAM module.

As shown in FIG. 3, memory interface 214 implements a differential clock signal (CK/CK#) 312, a single-ended point-to-point or point-to-multipoint command bus 314, and a differential, high-speed point-to-point serial address bus 316. The clock signal 312 is similar to the differential clock signals of the various DDRx interfaces (i.e., DDR2, DDR3, etc.). In one embodiment, the command bus 314 includes five interconnects, such as the CS#, RAS#, CAS#, WE# command signals in the DDR3 SDRAM interface but with different encoding. It will be appreciated that any number N of interconnects may be included in the command bus 314. The number of interconnects may be optimized to reflect the total number of commands that may be encoded on the command bus 314. For example, three interconnects enables up to eight commands to be encoded by the command bus. In one embodiment, the address bus 316 is a high-speed point-to-point differential serial link. In other words, the address bus 316 includes two interconnects connected between the memory interface 214 and the DRAM module 220. In another embodiment, the bandwidth of the address bus 316 is scalable by adding additional point-to-point differential serial links.

The address bus 316 is calibrated on power-up in order to operate reliably at high frequency. With conventional serial command/address buses, a low-speed sideband communications channel is typically included in order to communicate with DRAM module 220 prior to calibration. However, in the memory interface 214 illustrated in FIG. 3, the command bus 314, by design, is immediately available on power-up without any required calibration. Therefore, all serial link training may be performed via commands issued on the command bus 314 with no need for a separate sideband communications channel. For example, memory interface 214 may send a command to DRAM module 220 on command bus 314 that instructs the DRAM module 220 to begin an address link training sequence. Then, memory interface 214 transmits a sequence of training patterns (i.e., a predefined sequence of bits) to DRAM module 220 via address bus 316. The DRAM module 220 receives the training patterns and transmits the received patterns back to the memory interface via a data bus (not shown). The DRAM module 220 may store the training patterns sent over the address bus 316, which are later read by the memory interface 214 by issuing commands via the command bus 314. The memory interface 214 analyzes the data received by the DRAM module 220 to determine timing information and parameters to use for transmitting data on the address bus 316. The memory interface 214 may repeat the address link training sequence using different transmission parameters. Once the memory interface 214 has completed the address link training sequence, the high-speed, address bus 316 may be used to transmit addresses to DRAM module 220.

Advantageously, the command bus 314 is used to transmit commands to DRAM module 220 during normal operation. Unlike the conventional serial memory interfaces that implement a sideband signaling interface to calibrate the serial link, the memory interface 214 transmits commands to initialize the address bus 316 via the command bus 314. In addition, commands are sent to the DRAM module 220 via the command bus 313 during normal operation, thereby relieving the serial link of the additional bandwidth required when both commands and addresses are transmitted via the same serial link. In one embodiment, commands are sent via command bus 314 substantially simultaneously with addresses sent via the address bus 316. In other words, a command will be transmitted via command bus 314 during the same clock cycle as at least a portion of the address via the address bus 316. In other embodiments, commands may be sent via command bus 314 offset (i.e., not in the same clock cycle) from the addresses sent via address bus 316.

It will be appreciated that the memory interface 214 and DRAM module 220 described above as part of the parallel processing subsystem 112 may be implemented via other types of memory interfaces as well. For example, memory bridge 105 may implement the memory interface 214 to communicate with system memory 104. In addition, in other embodiments, parallel processing memory may include two or more DRAM modules 220 and a separate memory interface may be included for each DRAM module 220. In other embodiments, described below, a single memory interface may be connected to multiple DRAM modules 220 via a logic device. In yet other embodiments, the memory device may be a different type of memory such as MRAM, FRAM, or SRAM memory devices and this disclosure should not be construed as limited to only DRAM memory device implementations.

Figure 4:
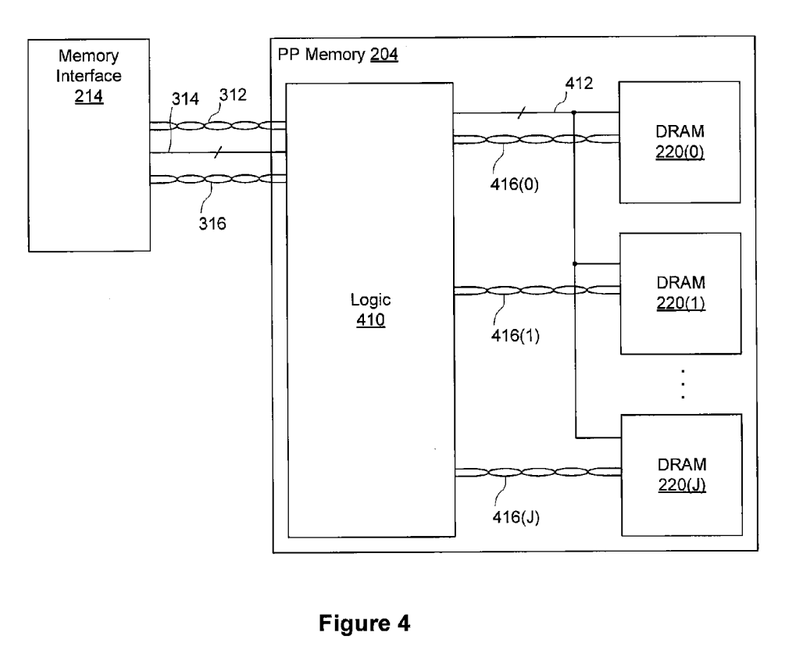
FIG. 4 illustrates a parallel processing memory that includes a plurality of DRAM modules, according to one embodiment of the present invention.

FIG. 4 illustrates a parallel processing memory 204 that includes a plurality of DRAM modules 220, according to one embodiment of the present invention. As shown in FIG. 4, a logic device 410 may be included in parallel processing memory 204 in addition to a plurality of DRAM modules 220. The logic device 410 provides an interface to memory interface 214. Logic device 410 receives the clock signal 312, commands transmitted via the command bus 314, and addresses transmitted by the address bus 316. Although not explicitly shown, the clock signal 312 is provided to each of the DRAM modules 220. In one embodiment, logic device 410 includes a clock fanout buffer that provides enough power to supply a clock signal to up to eight separate DRAM modules 220.

In one embodiment, the commands received by logic device 410 are transmitted to each of the DRAM modules 220 via a shared parallel bus 412. The addresses received by the logic device 410 may be transmitted to the corresponding DRAM module 220 via separate serial links (e.g., 416(0), 416(1), . . . , and 416(J)). For example, logic device 410 may contain a circuit that analyzes the command received via command bus 314 to determine which DRAM module 220 is identified by that particular command. The command may be used to control a demultiplexor within logic device 410 that connects the address bus 316 to one of the serial links 416(0) through 416(J) corresponding to the DRAM module 220 identified by the command. Thus, the command is forwarded to the correct DRAM module 220 via the shared parallel bus 412 while the address is forwarded to the correct DRAM module 220 via one of the serial links 416(0) through 416(J).

It will be appreciated that memory interface 214 may utilize the interface described above in connection with FIG. 3 (i.e., parallel command interface plus a high-speed differential serial interface for addresses), while the interface behind logic device 410 may implement a different type of interface to each DRAM module 220. For example, in one embodiment, logic device 410 may be connected to each DRAM module 220 via a parallel bus interface similar to the interface described by the JEDEC DDR3 SDRAM specification. Although the DDR3 SDRAM specification is limited to a particular bandwidth, the bandwidth of logic device 410 may be larger because multiple operations may be buffered by logic device 410 and transmitted to different DRAM modules 220 in parallel. Thus, the apparent bandwidth between the memory interface 214 and the CPU 102 would be much greater than the bandwidth available to any individual DRAM module 220.

Figure 5:
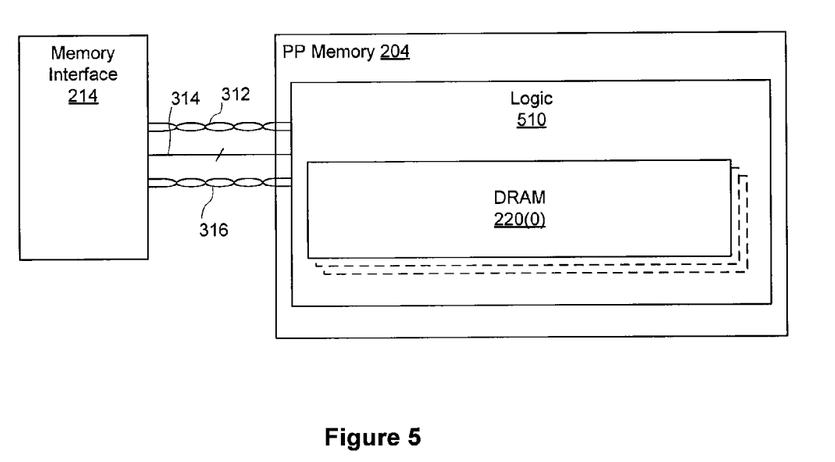
FIG. 5 illustrates a parallel processing memory that includes a plurality of DRAM modules, according to another embodiment of the present invention.

FIG. 5 illustrates a parallel processing memory 204 that includes a plurality of DRAM modules 220, according to another embodiment of the present invention. As shown, parallel processing memory 204 includes a logic device 510 connected to memory interface 214. Logic device 510 is similar to logic device 410 except that the DRAM modules 220 are included within logic device 510. In other words, while in the parallel processing memory 204 of FIG. 4 the DRAM modules 220 may be separate integrated circuits coupled to logic device 410 via a printed circuit board, the parallel processing memory 204 of FIG. 5 may include a single integrated circuit that implements the logic embodied in logic device 410 as well as the separate DRAM modules 220. Each of the various signals coupled to logic device 510 is then routed to the corresponding DRAM module 220 via interconnects within the integrated circuit.

Figure 6:
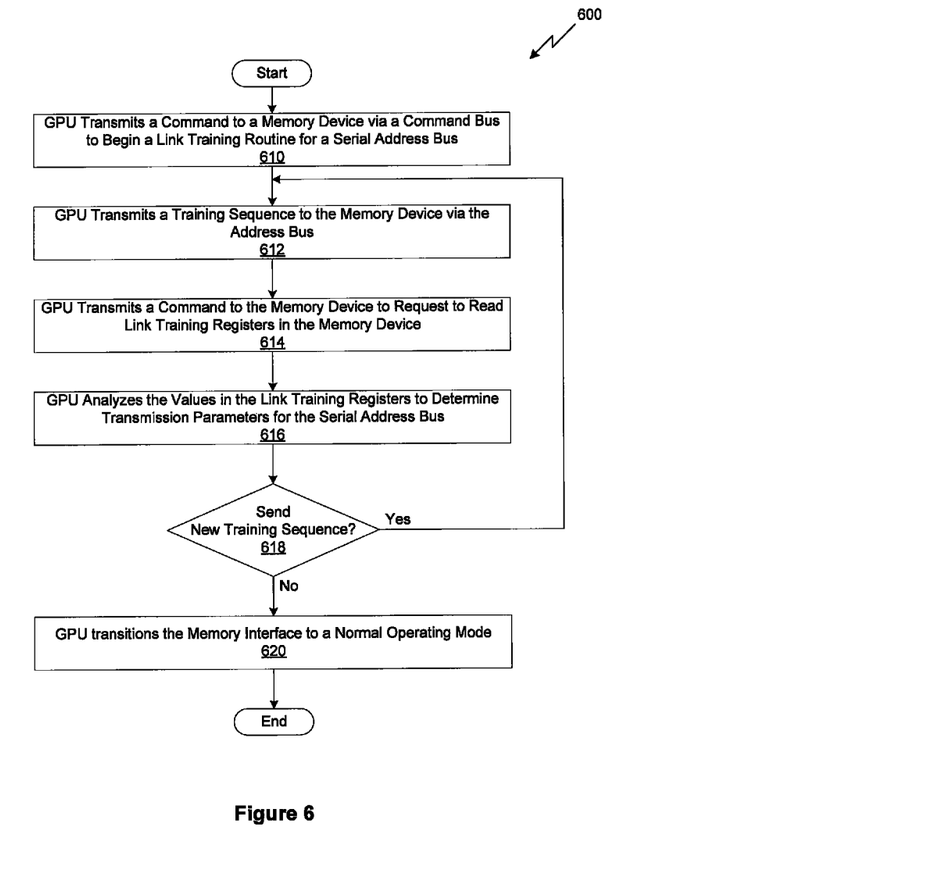
FIG. 6 sets forth a flowchart of a method for initializing a memory interface, according to one embodiment of the present invention.

FIG. 6 sets forth a flowchart of a method 600 for initializing a memory interface 214, according to one embodiment of the present invention. Although the method steps are described in conjunction with the systems of FIGS. 1-5, persons skilled in the art will understand that any system configured to perform the method steps, in any order, is within the scope of the present invention.

The method begins at step 610, where GPU 240 transmits a command to a parallel processing memory 204 via a command bus 314 in order to begin link training routine for a high-speed differential serial address bus 316. In one embodiment, the command indicates to the parallel processing memory 204 that a sequence of training patterns is going to be transmitted by the GPU 240 on the address bus 316. The parallel processing memory 204 is configured to store the data received on the address bus 316 in one or more link training registers. At step 612, GPU 240 transmits a sequence of training symbols to the parallel processing memory 204 via the address bus 316. The parallel processing memory 204 stores the received data in the link training registers. At step 614, GPU 240 transmits a command to the parallel processing memory 204 to request to read the received data stored in the link training registers. The parallel processing memory 204 transmits the received data to the GPU 240 via the data bus, similar to a normal memory read operation. In other embodiments, the data may be transmitted to the GPU 240 via other interconnects.

At step 616, GPU 240 analyzes the values read from the link training registers to determine configuration parameters for the address bus 316. For example, the GPU 240 may determine whether the data transmitted to the parallel processing memory 204 in step 612 matches the data received from the parallel processing memory 204 in step 614. At step 618, GPU 240 determines whether to transmit a new sequence of training symbols to the parallel processing memory 204. In one embodiment, if the data transmitted to the parallel processing memory 204 does not match the data read from the parallel processing memory 204, then GPU 240 will adjust the configuration of the address bus 316 and resend the link training sequence via the serial link by returning to step 612, discussed above. In another embodiment, GPU 240 implements a state machine to configure the address bus. As long as the state does not indicate that link training is complete, then GPU 240 transmits a new sequence of training symbols based on the current state and method 600 returns to step 612.

However, if GPU 240 determines that the link training is complete, then method 600 proceeds to step 620 where GPU 240 transitions the memory interface to a normal operating mode. In the normal operating mode, GPU 240 may send commands and addresses for memory operations to parallel processing memory 204 on the command bus 314 and address bus 316, respectively. Then, method 600 terminates.

In sum, the disclosed technique enables a GPU to transmit commands and addresses to a memory device via a parallel command bus and a high-speed serial address bus. The parallel command bus may be used to initiate communications with the memory device on power-up. Furthermore, commands that initiate calibration of the serial address bus are sent to the memory device via the parallel command bus. Once the device is calibrated, normal operation may resume where commands are transmitted via the parallel command bus and addresses are transmitted via the serial address bus.

One advantage of the disclosed technique is that the number of interconnects required to transmit commands and addresses to the memory device is reduced relative to industry standard parallel interfaces. In addition, by separating the command bus from the address bus, the small parallel command bus may be used to initiate calibration of the serial address bus, thereby obviating the need for a separate, low-speed sideband communications channel that is not used during normal operation.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

In view of the foregoing, the scope of the invention is determined by the claims that follow.

What is claimed is:

1. A memory interface configured to communicate with a memory device, the memory interface comprising:
   a differential clock channel for transmitting a reference clock signal to the memory device;
   a parallel command bus for transmitting one or more commands in parallel from the memory interface to the memory device, wherein the parallel command bus does not require calibration on power-up; and
   a serial address bus for transmitting one or more addresses to the memory device, wherein each address identifies a location within the memory device, and wherein, after a power-up operation but before the one or more addresses are transmitted via the serial address bus, the serial address bus is calibrated via a link training routine.

2. The memory interface of claim 1, wherein a command transmitted via the parallel command bus is associated with at least a portion of an address transmitted substantially simultaneously in a same clock cycle via the serial address bus.

3. The memory interface of claim 1, wherein the memory device comprises a dynamic random access memory (DRAM).

4. The memory interface of claim 1, further comprising a data bus, wherein the link training routine comprises:
   transmitting via the parallel command bus a first command to the memory device to indicate that a sequence of training patterns is to be sent to the memory device via the serial address bus;
   transmitting via the serial address bus the sequence of training patterns to the memory device, wherein the memory device stores values that reflect received versions of the sequence of training patterns in link training registers;
   transmitting via the parallel command bus a second command to the memory device to request access to the values stored in the link training registers;
   reading the values stored in the link training registers via the data bus; and based on the values read from the link training registers, determining transmission parameters associated with the serial address bus.

5. The memory interface of claim 1, wherein the memory device comprises:
   a plurality of DRAM modules; and
   a logic device coupled to the memory interface and including logic configured to transmit commands received via the command bus to each of the DRAM modules in the plurality of DRAM modules and, for each command, transmit one or more addresses received via the serial address bus to a particular DRAM module in the plurality of DRAM modules identified by the command.

6. The memory interface of claim 5, wherein the plurality of DRAM modules is contained within the same integrated circuit as the logic device.

7. A system comprising:
   a memory device; and
   a memory interface configured to communicate with the memory device, the memory interface including:
      a differential clock channel for transmitting a reference clock signal to the memory device,
      a parallel command bus for transmitting one or more commands from the memory interface to the memory device, wherein the parallel command bus does not require calibration on power-up; and
      a serial address bus for transmitting one or more addresses to the memory device, wherein each address identifies a location within the memory device, and wherein, after a power-up operation but before the one or more addresses are transmitted via the serial address bus, the serial address bus is calibrated via a link training routine.

8. The system of claim 7, wherein a command transmitted via the parallel command bus is associated with at least a portion of an address transmitted substantially simultaneously in a same clock cycle via the serial address bus.

9. The system of claim 7, wherein the memory interface is included within a graphics processing unit (GPU).

10. The system of claim 7, wherein the memory device comprises a dynamic random access memory (DRAM).

11. The system of claim 7, wherein the memory interface further comprises a data bus and the link training routine comprises:
   transmitting via the parallel command bus a first command to the memory device to indicate that a sequence of training patterns is to be sent to the memory device via the serial address bus;
   transmitting via the serial address bus the sequence of training patterns to the memory device, wherein the memory device stores values that reflect received versions of the sequence of training patterns in link training registers;
   transmitting via the parallel command bus a second command to the memory device to request access to the values stored in the link training registers;
   reading the values stored in the link training registers via the data bus; and
   based on the values read from the link training registers, determining transmission parameters associated with the serial address bus.

12. The system of claim 7, wherein the memory device comprises:
   a plurality of DRAM modules; and
   a logic device coupled to the memory interface and including logic configured to transmit commands received via the command bus to each of the DRAM modules in the plurality of DRAM modules and, for each command, transmit one or more addresses received via the serial address bus to a particular DRAM module in the plurality of DRAM modules identified by the command.

13. The system of claim 12, wherein the plurality of DRAM modules is contained within the same integrated circuit as the logic device.

14. A method for communicating with a memory device, the method comprising:
   transmitting a reference clock signal to the memory device via a differential clock channel;
   transmitting one or more commands from the memory interface to the memory device via a parallel command bus, wherein the parallel command bus does not require calibration on power-up; and
   transmitting one or more addresses to the memory device via a serial address bus, wherein each address identifies a location within the memory device, and after a power-up operation but before the one or more addresses are transmitted via the serial address bus, calibrating the serial address bus via a link training routine.

15. The method of claim 14, wherein a command transmitted via the parallel command bus is associated with at least a portion of an address transmitted substantially simultaneously in a same clock cycle via the serial address bus.

16. The method of claim 14, wherein the memory device comprises a dynamic random access memory (DRAM).

17. The method of claim 14, wherein the link training routine comprises:
   transmitting via the parallel command bus a first command to the memory device to indicate that a sequence of training patterns is to be sent to the memory device via the serial address bus;
   transmitting via the serial address bus the sequence of training patterns to the memory device, wherein the memory device stores values that reflect received versions of the sequence of training patterns in link training registers;
   transmitting via the parallel command bus a second command to the memory device to request access to the values stored in the link training registers;
   reading the values stored in the link training registers via the data bus; and
   based on the values read from the link training registers, determining transmission parameters associated with the serial address bus.

* * * * *

UNITED STATES PATENT AND TRADEMARK OFFICE
CERTIFICATE OF CORRECTION

PATENT NO. : 8,738,852 B2
APPLICATION NO. : 13/223004
DATED : May 27, 2014
INVENTOR(S) : Gupta et al.

Page 1 of 1

It is certified that error appears in the above-identified patent and that said Letters Patent is hereby corrected as shown below:

Title Page, References Cited (56):

Please insert --2006/0045206 A1 3/2006 Keeth et al.--;

Please insert --2009/0067240 A1 3/2009 Roohparvar et al.--;

Please insert --2009/0196102 A1 8/2009 Kim--;

Please insert --Zerbe, J. et al. "A 5 Gb/s link with matched source synchronous and common-mode clocking techniques", In: IEEE Journal of solid-state circuits, 46, Issue 4, pages 974 to 985, ISSN 0018-9200, Published March 3, 2011--;

Please insert --Translation of German Office Action, dated April 3, 2014, for Application No. 10-2012 215 197.4--;

CLAIMS:

Column 10, Claim 1, Line 36, please delete "in parallcl".

Signed and Sealed this
Twenty-sixth Day of August, 2014

Michelle K. Lee
*Deputy Director of the United States Patent and Trademark Office*